Nov. 14, 1961 G. P. WEIMAR, JR 3,009,154

DIRECTIVE ANTENNA SYSTEM

Filed Sept. 5, 1957 2 Sheets-Sheet 1

INVENTOR.
GEORGE P. WEIMAR, JR.
BY
Robert D. Sanborn
ATTORNEY

Nov. 14, 1961 G. P WEIMAR, JR 3,009,154

DIRECTIVE ANTENNA SYSTEM

Filed Sept. 5, 1957 2 Sheets-Sheet 2

INVENTOR.
GEORGE P. WEIMAR, JR.
BY
Robert D. Sanborn
ATTORNEY

United States Patent Office 3,009,154
Patented Nov. 14, 1961

3,009,154
DIRECTIVE ANTENNA SYSTEM

George P. Weimar, Jr., Shreveport, La., assignor to Philco Corporation, Philadelphia, Pa., a corporation of Pennsylvania Filed Sept. 5, 1957, Ser. No. 682,233
10 Claims. (Cl. 343—840)

The present invention relates to antenna systems and more particularly to broad band directional antennas for ultrahigh-frequency systems.

There is great need in the field of radio communication for an ultrahigh-frequency antenna which has high gain, is focusable, is extremely broad band and can be matched to a conventional transmission line over a very wide band of frequencies. For example, certain areas not within range of regular television stations are served by "translator" stations. These translator stations are relay stations which receive a television signal from the primary station on one channel or carrier frequency and rebroadcast the same intelligence signal on a different channel or carrier frequency. Present regulations require all VHF television channels to be rebroadcast on one of the UHF channels assigned to television broadcasting. In an area in which the signals of two or more VHF television stations may be received by a translator station it is usually more economical to employ a single multichannel translator station to relay the programs of both or all of the primary stations than it is to employ separate translator stations for each VHF station. If more than one program is to be relayed, separate UHF channels will be required for each program. The UHF channels assigned by the Federal Communications Commission for such rebroadcasts may be separated from each other by 100 megacycles or more. In the past, this wide frequency separation between assigned channels has made it impractical to employ a single transmitting antenna for all channels which might be handled by a translator station.

The nature of the terrain or the size of the area to be covered may require that the antenna of the translator station be located several miles away from the ultimate reception area. Present regulations limit translator stations to not more than 10 watts of radio frequency power output. Therefore a high gain transmitting antenna is required if adequate signal strength is to be maintained in the reception area. The radiation pattern of the antenna should be adjustable so that it can be made to conform to the area to be served.

The nature of the television signal requires that the entire transmission system, including the antenna system, be substantially entirely free of standing waves. This is especially true if color programs are to be rebroadcast. For example, a high standing wave ratio at one frequency might suppress or distort the color burst signals present in a color TV signal. Even in the rebroadcast of black and white television signals the phase delays and other distortions attributable to the presence of standing waves at the translator can seriously degrade the picture on the television receiver.

Known forms of antenna systems fail to meet the requirements for television translator service for one or more reasons. Known forms of parabolic reflectors normally have a relatively high voltage standing wave ratio, of the order of 1.5 to 1. Parabolic reflectors fed from a dipole have the added disadvantage that the frequency sensitivity of the dipole is added to the frequency sensitivity of the reflector. As a result, severe variations in voltage standing wave ratio occur in such systems even within the six megacycle band required to transmit a single television channel. The above difficulties are encountered even if the antenna system is specifically designed for single channel operation. Since such an antenna system will not operate satisfactorily on a single channel, obviously it cannot be employed to broadcast two or more widely separated channels.

Arrays of dipoles with and without reflectors have proved to be generally unsatisfactory. Arrays of antenna elements require a critical spacing measured in terms of wavelength for proper operation. Therefore such arrays are inherently narrow band systems. As mentioned previously, the dipoles which go to make up the array are also narrow band devices. Therefore the beam from such an antenna has many irregularities.

Discone antennas are known to be extremely broad band. It is possible to match a discone antenna to a coaxial line with a voltage standing wave ratio of less than 1.1 to 1 over a frequency range of 100 megacycles or more, for example, over the range from 600 to 700 megacycles. The discone antenna is not a satisfactory transmitting antenna, however, because of its low gain characteristic. Previous attempts to combine a discone antenna with a parabolic reflector in order to improve the gain characteristic have met with little success. In the systems of the prior art the elements of the array were arranged in accordance with conventional antenna theory—that is, the discone antenna was mounted at the focus of the parabolic reflector with the axis of the discone perpendicular to the axis of the reflector. While this combination has proved useful for certain communication systems, it is entirely unsuited for television transmission. The parabolic reflectar intercepts only a small portion of the energy radiated by the discone antenna and, as a result, the directivity and gain of the system is low. The radiation field of the system is a combination of the direct radiation from the discone and radiation from the reflector. Therefore the system has a higher standing wave ratio and less uniform frequency response than a discone antenna alone. In the array just mentioned the discone antenna is directly in the path of the energy reflected from the parabolic reflector. This may cause the apparent impedance of the discone antenna to be a function of frequency and hence cause relatively rapid fluctuations in the gain versus frequency characteristic of the system.

It is an object of the present invention to provide a novel wide band directive antenna system which overcomes the limitations of prior art systems.

It is a further object of the present invention to provide an antenna system which can be matched to a transmission line over an extremely wide band of frequencies.

Still another object of the present invention is to provide a wide band antenna system in which the beam width may be adjusted over a relatively wide range.

A more particular object of the invention is to provide an antenna system which is ideally adapted to radiating simultaneously two or more signals occupying different and widely separated channels in the ultrahigh-frequency television band.

These and other objects of the invention are accomplished by providing a new and ingenious combination of antenna elements which give a performance far superior to any that could be predicted from conventional antenna theory. In the present invention an antenna is mounted substantially at the focus of a reflector such that the E field of the antenna is substantially parallel to the directive axis of the reflector. It has been found that this novel positioning of the elements of the system causes the system to have a very high gain while at the same time holding the standing wave ratio of the system to a very low value over a very wide band of frequencies. More specifically, in one preferred embodiment of the invention, a discone antenna is mounted with the axis of rotational symmetry of the discone substantially coincident with the directive axis of a paraboloidal reflector, thereby to provide the desired relationship between the field of the antenna and the axis of the reflector.

For a better understanding of the present invention, together with other and further objects thereof, reference should now be made to the following detailed description which is to be read in conjunction with the accompanying drawings in which.

Figure 1:
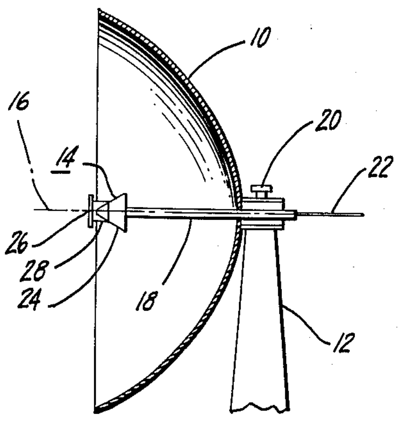
FIG. 1 is a side elevation partially in section of a preferred embodiment of the present invention.
Figure 2:
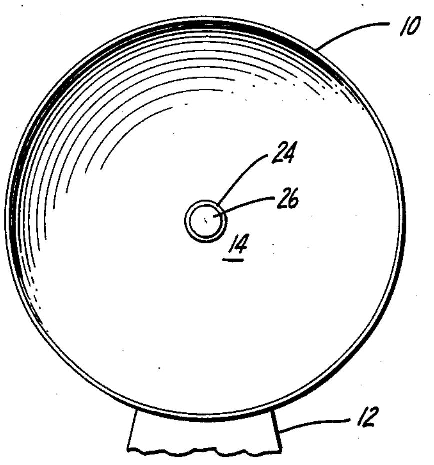
FIG. 2 is a front elevation of the antenna system of FIG. 1.

Turning now to FIGS. 1 and 2 it will be seen that the antenna system there shown comprises a reflector 10 mounted on a pedestal 12. Reflector 10 preferably has the form of a surface of revolution. The reflector 10 of FIG. 1 is a paraboloid of revolution but in some instances it may be desirable to substitute other shapes. Means may be provided on the pedestal for adjusting the azimuth and tilt of the reflector 10 but this is not essential since the antenna system normally will remain pointed in one direction. The reflector 10 is illuminateed by a discone antenna 14 which is mounted in the vicinity of the focus of reflector 10. A discone antenna is an antenna comprising a disc and a cone positioned so as to have a common axis of rotational symmetry. The disc and the apex of the cone are separated by a small gap. As shown in FIG. 1, the axis of rotational symmetry of the discone antenna 14 is coincident with the axis of revolution 16 of the paraboloidal reflector 10. The term "axis" of reflector 10 as hereinfater used refers to the axis of revolution 16.

As will be explained presently, the antenna system of FIG. 1 may be focused by adjusting the position of discone 14 along the axis 16 of reflector 10. To facilitate focusing of the antenna system, discone antenna 14 is supported on a hollow shaft 18 which passes through the center of reflector 10. Clamping means 20 is provided at the point at which shaft 18 passes through reflector 10 for holding shaft 18 in a selected position. In many instances, for example instances in which the antenna is designed for a specific existing installation, it will not be necessary to adjust the position of discone antenna 14. Therefore clamping means 20 may be omitted if desired and shaft 18 permanently fastened in one position to the paraboloid reflector 10 or the supporting means therefor.

Energy is supplied to discone antenna 14 by means of a coaxial line 22 which passes through hollow shaft 18 and connects with the cone 24 and disc 26 of the discone antenna 14. The outer conductor of coaxial line 22 is connected to cone 24 and the inner conductor is connected to disc 26. As shown in greater detail in FIG. 3, disc 26 may be supported from cone 24 by means of an electrically transparent insulating member 28. Member 28 may also serve as means for sealing the end of the coaxial line 22.

Discone antennas and design data therefor have been described in the literature. However since this form of antenna is not as well known as other forms of antennas, a brief description of the discone per se will be given with reference to FIG. 3. Parts in FIG. 3 corresponding to like parts in FIG. 1 have been given the same reference numerals.

Figure 3:
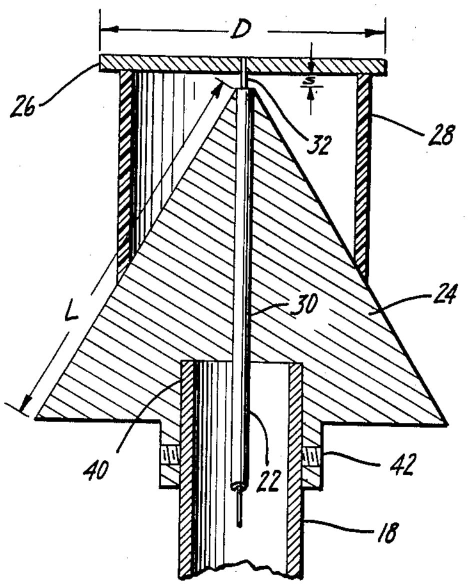
FIG. 3 is a detailed view of the discone antenna employed in the antenna system of FIG. 1.

All parts in FIG. 3 are in section with the exception of coaxial transmission line 22. As shown in FIG. 3, cone 24 may be formed of a solid block of conductive material with an axial opening 30 formed therein for receiving coaxial line 22. At the apex 32 of conical member 24 the outer conductor of coaxial line 22 may be flared outwardly and soldered to cone 24. The inner conductor of coaxial line 22 is electrically joined to disc 26. This may be accomplished in a convenient manner by drilling disc 26 and soldering the inner conductor within the drilled opening. Insulator 28 may be formed of a plastic material such as the methyl methacrylate polymer sold under the trade name Lucite. It may be secured to disc 26 and cone 24 by means of plastic cement especially designed for the purpose. If insulator 28 is in the form of a complete cylinder as shown in FIG. 3, it may be employed as a gas-tight seal at the end of coaxial line 22. Alternatively, weepholes (not shown in FIG. 3) may be provided for the escape of moisture. Insulating rods may be substituted for cylinder 28 or both the rods and the cylinder may be omitted and disc 26 supported solely by the inner conductor of coaxial line 22.

Cone 24 may be secured to shaft 18 in any convenient manner. As shown in FIG. 3 cone 24 is provided with an aperture 40 to receive the end of supporting shaft 18. Set screws 42 are provided for securing cone 14 to shaft 18. Very little energy flows around the base of the cone of the discone antenna. Therefore it is usually not necessary to provide radio frequency chokes on the outer surface of shaft 18.

Two considerations are involved in selecting the dimensions of the discone. The discone element should provide a matched termination for the transmission line 22 over the band of frequencies to be transmitted and, secondly, the radiation pattern of the discone should be displaced toward the base of the cone to minimize direct radiation from the discone itself. For a better understanding of this latter requirement reference should be made to FIG. 4. The radiation pattern 60 of the discone antenna 14 is rotationally symmetrical about axis 62. If the slant height ∠ of the cone 24 is of the order of a quarter of a wavelength, the pattern will be nearly symmetrical about plane 64 which is perpendicular to axis 62. However for small apex angles and slant heights ∠ equal to $2\lambda/4$ to $3\lambda/4$, where $\lambda$ is the wavelength of the energy to be radiated, the pattern is displaced toward the base of the cone. At apex angles of the order of 60° the pattern is displaced toward the base as shown at 60 in FIG. 4 and the impedance of the discone is such that it can be matched to coaxial line 22 over a band of 100 megacycles or more with a standing wave ratio of less than 1.1 to 1. At small apex angles, of the order of 35°, the pattern lies almost entirely to one side of plane 64. However the impedance of such a discone varies somewhat with frequency making it impossible to match the discone 14 to coaxial line 22 over a wide band of frequencies. The following dimensions have been found to give highly satisfactory results in the band from 800 to 900 megacycles.

| | |
|---|---|
| Apex angle $\phi$ | 60° |
| Disc diameter D | 4.72″ |
| Cone slant height ∠ | 6.56″ |
| Cone to disc spacing S | 0.119″ |
| Diameter cone—apex | 0.4″ |
| Diameter cone—base | 6.56″ |

The thickness of disc 26 was 0.25″ and the diameter of shaft 18 was 2″ but these last two dimensions are not critical. The disc 26 and cone 24 should be silver plated to provide good surface conductivity. Insulator 18 was formed of Lucite tubing 4″ O.D. with ¼″ wall thickness. Reflector 20 had a diameter of 7′. RG–8/U coaxial cable was employed for line 22.

Figure 4:
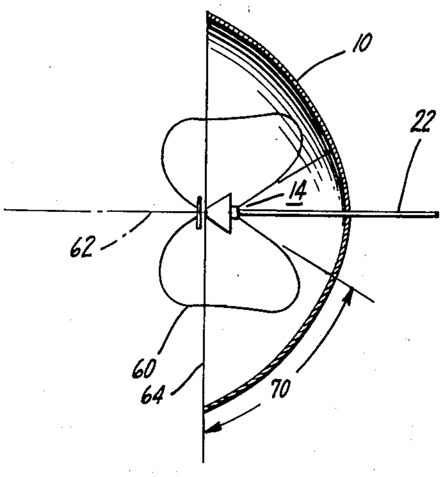
FIG. 4 is a sketch illustrating the radiation field of the antenna system of FIG. 1.
Figure 7:
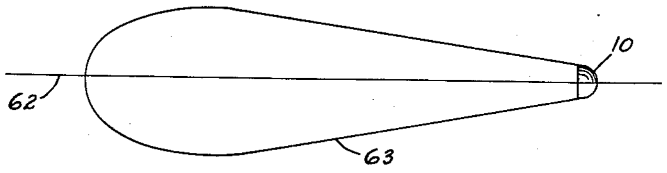
FIG. 7 is a view showing the beam pattern produced by the antenna system of FIGS. 1 and 2.

The operation of the present antenna will now be explained with reference to FIGS. 4 and 7. Discone 14 is positioned adjacent the focus of reflector 10. The energy from discone 14 illuminates reflector 10 in a zone 70 adjacent the outer rim of the paraboloid. It has been observed that the energy is reradiated from the paraboloidal reflector 10 in the form of a conical beam having an apex angle of the order of 20°. This beam is shown at 63 in FIG. 7. The conical beam 63 is centered on the axis 62 and is substantially free of nulls over the entire width of the beam.

It will be seen that the form of the beam produced by the antenna of FIGS. 1 and 2 is quite different from that produced by a simple dipole located at the focus of a paraboloid of revolution and oriented so that the E field is parallel to the axis of revolution of the reflector. It is believed that this difference in radiation pattern may be due to the fact that the distribution of energy about a discone dimensioned as described herein is different from the distribution of energy about a simple dipole antenna. It is well known that the intensity distribution as a function of the angle of radiation is not the same for a simple dipole as it is for a discone antenna dimensioned as described herein. It is believed that the physical differences between the simple dipole antenna and the discone antenna also result in a difference in the phase distribution as a function of the angle of radiation.

It has been observed that the presence of the paraboloidal reflector does not increase the standing wave ratio present on the coaxial line feeding the discone. This fact, together with the known intensity variation of energy radiated from the discone antenna, would suggest that none of the energy reflected or reradiated from the reflector 10 again passes over discone 14.

The illumination of reflector 10 only in zone 70 has the further advantage that the system of FIG. 1 is thereby made more highly directive than would be the case if the paraboloid 10 was illuminated uniformly.

One novel feature of the present invention is that the energy as it leaves the discone 14 is polarized in the direction of the axis 16 of the reflector 10. In conventional forms of reflector feed systems the polarization of the energy supplied by the antenna feed means is in a plane perpendicular to the axis of directivity of the reflector. While it would first appear that this arrangement of feed and reflector would possibly result in cancellation of the radiated signal in the direction of the axis 16, since diametrically opposed points on the reflector aperture appear to be energized in phase opposition, it has been found in practice that in the type of service mentioned above there is no noticeable null region and the radiation is relatively constant over at least a substantial portion of the main lobe of the radiation pattern.

It has been found that an antenna system of the dimensions givein above has a beam width of the order of 18° with the discone 14 at the focus of the paraboloidal reflector 10. The beam width can be increased to 22.5° or more by moving discone 14 closer to reflector 10.

The outstanding improvement in performance brought about by the present invention is illustrated by the following example. At the time applicant made his invention the best antenna system commercially available for television translator systems in the 800–900 megacycle band had a beam width of the order of 105° at the half power points. The standing wave ratio of the antenna was of the order of 1.1 to 1 in the band of interest. At ten watts input to the antenna the signal strength at five miles from the antenna was less than 50 microvolts. With the present antenna operating under the same conditions the beam width was 22.5°, the voltage standing wave ratio was of the order of 1.025 to 1, and the field strength was of the order of 600–900 microvolts over the beam width.

Figure 5:
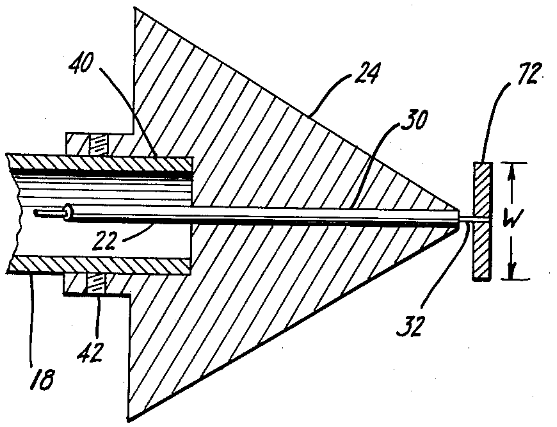
FIG. 5 is a view partially in section of a modified discone antenna element which may be employed in the antenna system of FIG. 1.
Figure 6:
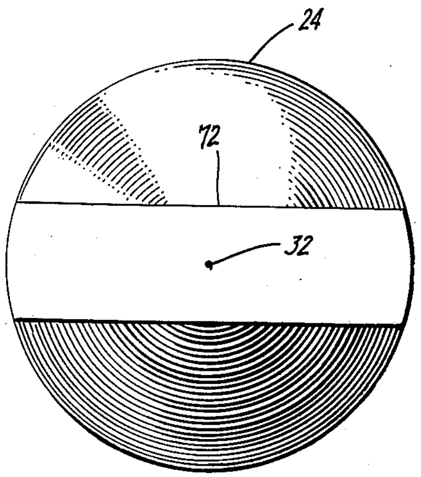
FIG. 6 is a second view of the antenna element of FIG. 5 taken parallel to the axis of the cone.

In television translator service and in other similar applications where the signal from the transmitting antenna is directed at a plurality of receiving locations in one general area, the aspect angle of the intended receiving area is usually much greater in the horizontal plane than in the vertical plane. Therefore the ideal beam configuration is a flat fan-shaped beam which confines all of the radiated energy to the desired reception area. The antenna system shown in FIG. 1 provides a substantially conical beam. As a result, not all of the energy in the beam is directed toward the intended reception area. It has been found in practice that the beam pattern of the system can be made to approach the desired fan-shaped configuration by replacing the disc 26 of FIGS. 1 and 3 with a plate having substantially the same length as the diameter of disc 26 but a narrower width. FIGS. 5 and 6 illustrate this modified form of discone antenna. Parts in FIGS. 5 and 6 corresponding to like parts in FIG. 3 have been given the same reference numeral. In FIGS. 5 and 6 plate 72 is shown as having the form of the central portion of a circular disc, equal upper and lower sectors of the disc having been removed. It is believed that the width *w* of plate 72 is not critical but depends upon the degree of beam shaping which is desired. It has been found in practice that the width *w* of plate 72 may be reduced to the point that plate 72 becomes a rod-like member extending along a diameter of the original disc 26. Replacing disc 26 with a rod-like member does not cause any substantial increase in the voltage standing wave ratio of the system. In practice it was found that, by replacing disc 26 with a rod-shaped member having a length substantially equal to the diameter of the disc 26, the signal strength in the intended receiving area was approximately doubled. Replacing disc 26 with a rod or plate 72 may require the repositioning of the modified discone antenna with respect to the focus of the reflector in order to obtain optimum coverage in the horizontal plane.

It should be obvious that the embodiments of the invention which have been described as transmitting antennas may be employed also as wide band, relatively high gain receiving antennas.

While the invention has been described with reference to certain preferred embodiments thereof, it will be apparent that various modifications and other embodiments thereof will occur to those skilled in the art within the scope of the invention. Accordingly I desire the scope of my invention to be limited only by the appended claims.

What is claimed is:

1. An antenna system comprising a paraboloidal reflector, a discone antenna, means extending along the axis of said paraboloidal reflector for supporting said discone antenna in the vicinity of the focus of said reflector with the axis of rotational symmetry of said reflector and said discone antenna in substantial coincidence, said discone antenna being positioned with the cone nearer the reflector than the disc, said discone antenna being dimensioned so that the energy radiation pattern thereof is displaced toward said reflector.

2. The antenna system of claim 1 wherein said means for supporting said discone antenna is adjustable to permit movement of said discone antenna relative to said reflector along said axis of rotational symmetry of said reflector.

3. The antenna system of claim 1 wherein the focus of said reflector lies substantially in the aperture plane of said reflector.

4. The antenna system of claim 1 wherein the apex angle of the cone of said discone antenna is approximately 60°.

5. The antenna system of claim 1 wherein the apex angle of the cone of said discone antenna is approximately 60° and the slant height of said cone is between $\lambda/2$ and $3\lambda/4$, where $\lambda$ is the operating wavelength of the antenna system.

6. The antenna system of claim 1 wherein the focus of said reflector lies substantially in the aperture plane of said reflector and wherein said apex angle of the cone of said discone antenna is approximately 60° and the slant height of said cone is between $\lambda/2$ and $3\lambda/4$ where $\lambda$ is the operating wave-length of the antenna system.

7. An antenna system comprising a paraboloidal reflector, the focus of said paraboloidal reflector lying in the vicinity of the aperture plane thereof, a discone antenna, means extending along the axis of said paraboloidal reflector for supporting said discone antenna with the axis of rotational symmetry thereof coincident with the directive axis of said reflector, said discone antenna being positioned with the cone nearer the reflector than is the disc, the cone of said discone antenna having an apex angle much less than 90° and much greater than 30° and a slant height at least equal to approximately a half waveleingth at the operating frequency, whereby the energy radiation pattern of said discone is displaced toward the reflector and the input impedance of said antenna system remains substantially constant over a bandwidth greater than one-tenth the operating frequency.

8. An antenna system comprising a paraboloidal reflector, a primary feed element for said reflector, said feed element comprising a conical member having an apex angle much less than 90° and much greater than 30° and a slant height at least equal to approximately a half wavelength at the operating frequency, said conical member being positioned with the axis of rotational symmetry thereof substantially coincident with the directive axis of said reflector, and with the base nearer said reflector than is the apex, and a second member disposed in a plane perpendicular to the directive axis of said reflector and more remote from said reflector than is said apex, and a two-conductor transmission line, one conductor of said transmission line being connected to said conical member and the other conductor of said transmission line being connected to said second member.

9. An antenna system as in claim 8 wherein said second member is a unitary rod-like member having a length substantially equal to the diameter of the base of said conical member, the mid-point of said rod-like member being disposed adjacent the apex of said conical member.

10. An antenna system as in claim 8 wherein said second member comprises a plate disposed transversely to said directive axis of said reflector, said plate having a length greater than its width measured in the plane transverse to the axis of said reflector, said plate being disposed with the mid-point thereof adjacent the apex of said conical element.

References Cited in the file of this patent

UNITED STATES PATENTS

| | | |
|---|---|---|
| 2,054,895 | Dallenbach | Sept. 22, 1936 |
| 2,370,053 | Lindenblad | Feb. 20, 1945 |
| 2,407,057 | Carter | Sept. 3, 1946 |
| 2,477,694 | Gutton | Aug. 2, 1949 |
| 2,640,928 | Kandoian | June 2, 1953 |
| 2,644,092 | Risser | June 30, 1953 |

OTHER REFERENCES

Pub. I, Antennas, Kraus, McGraw-Hill, 1950, pp. 339–341 and pp. 420–421.

Pub. II, Three New Antenna Types and Their Applications, IRE Proceedings, Vol. 34, February 1946, pp. 70W–71W.